US010907537B2

(12) United States Patent
Andersson et al.

(10) Patent No.: US 10,907,537 B2
(45) Date of Patent: Feb. 2, 2021

(54) IGNITION MODULE WITH LOW SPEED CONTROL

(71) Applicant: Walbro LLC, Tucson, AZ (US)

(72) Inventors: Martin N. Andersson, Caro, MI (US);
Cyrus M. Healy, Ubly, MI (US);
Robby L. Linton, Saginaw, MI (US)

(73) Assignee: Walbro LLC, Tucson, AZ (US)

( * ) Notice: Subject to any disclaimer, the term of this patent is extended or adjusted under 35 U.S.C. 154(b) by 0 days.

(21) Appl. No.: 16/495,910

(22) PCT Filed: Mar. 19, 2018

(86) PCT No.: PCT/US2018/023111
§ 371 (c)(1),
(2) Date: Sep. 20, 2019

(87) PCT Pub. No.: WO2018/175304
PCT Pub. Date: Sep. 27, 2018

(65) Prior Publication Data
US 2020/0032699 A1    Jan. 30, 2020

Related U.S. Application Data

(60) Provisional application No. 62/474,143, filed on Mar. 21, 2017.

(51) Int. Cl.
| F02B 63/02 | (2006.01) |
| F02P 1/08 | (2006.01) |
| F02P 5/155 | (2006.01) |
| F02N 3/02 | (2006.01) |
| F02P 9/00 | (2006.01) |

(52) U.S. Cl.
CPC .............. *F02B 63/02* (2013.01); *F02P 1/086* (2013.01); *F02P 5/1558* (2013.01); *F02N 3/02* (2013.01); *F02N 2250/02* (2013.01); *F02P 9/00* (2013.01)

(58) Field of Classification Search
CPC ......... F02B 63/02; F02P 1/086; F02P 5/1558; F02P 9/00; F02N 3/02; F02N 2250/02
USPC ........ 123/406.57, 406.56, 185.2, 185.3, 599, 123/600
See application file for complete search history.

(56) References Cited

U.S. PATENT DOCUMENTS

| 4,697,570 A | * | 10/1987 | Ionescu ................... | F02P 1/086 123/406.57 |
| 4,924,831 A | * | 5/1990 | Piteo ....................... | F02P 1/086 123/406.57 |
| 5,383,433 A | | 1/1995 | Fiorenza, II | |

(Continued)

FOREIGN PATENT DOCUMENTS

WO    WO2014179697 A1    11/2014

OTHER PUBLICATIONS

Written Opinion & International Search Report for PCT/US2018/023111 dated Jul. 3, 2018, 17 pages.

*Primary Examiner* — Mahmoud Gimie
(74) *Attorney, Agent, or Firm* — Reising Ethington P.C.

(57) ABSTRACT

In at least some implementations, an ignition system for a combustion engine includes analog circuit components arranged to control ignition events at an engine speed below a first threshold of engine speed and a microprocessor to control ignition events at engine speeds higher than the first threshold. Hence, ignition can be controlled at lower engine cranking speeds to facilitate starting the engine at lower engine rotational speeds.

19 Claims, 2 Drawing Sheets

(56) References Cited

U.S. PATENT DOCUMENTS

| | | | |
|---|---|---|---|
| 6,575,134 B1* | 6/2003 | Bowling | F02D 31/001 123/149 D |
| 7,198,028 B2* | 4/2007 | Andersson | F02P 5/1504 123/339.11 |
| 7,448,358 B2 | 11/2008 | Andersson et al. | |
| 7,546,846 B2 | 6/2009 | Massengale et al. | |
| 7,631,633 B2* | 12/2009 | Sasaki | F02P 1/086 123/406.57 |
| 2001/0042542 A1* | 11/2001 | Sato | F02P 7/077 123/599 |
| 2004/0154592 A1* | 8/2004 | Fujima | F02P 3/0838 123/406.57 |
| 2008/0178841 A1 | 7/2008 | Andersson et al. | |
| 2010/0012084 A1 | 1/2010 | Andersson et al. | |
| 2013/0127511 A1 | 5/2013 | Geer et al. | |

* cited by examiner

IGNITION MODULE WITH LOW SPEED CONTROL

REFERENCE TO RELATED APPLICATIONS

This application claims the benefit of U.S. Provisional Application Ser. No. 62/474,143 filed on Mar. 21, 2017, the entire contents of which are incorporated herein by reference in its entirety.

TECHNICAL FIELD

The present disclosure relates generally to a capacitive discharge ignition system.

BACKGROUND

Capacitive discharge ignition (CDI) systems are sometimes used with small engines, including light-duty internal combustion engines such as those employed by lawn, garden, and other outdoor equipment. Many such systems include a microprocessor that controls the timing of ignition events but do not include a battery to provide power to the ignition system or microprocessor. At low engine cranking speeds during an attempt to start the engine, the microprocessor might not be powered sufficiently to enable it to control ignition events and the engine may fail to start, or be difficult to start at lower cranking speeds and instead require relatively high cranking speeds in order to start.

SUMMARY

In at least some implementations, an ignition system for a combustion engine includes analog circuit components arranged to control ignition events at an engine speed below a first threshold of engine speed and a microprocessor to control ignition events at engine speeds higher than the first threshold. Hence, ignition can be controlled at lower engine cranking speeds to facilitate starting the engine at lower engine rotational speeds.

In the system, the analog circuit components may include a charge coil, a trigger coil, a main ignition switch, and a peak detection circuit coupled to the main ignition switch and adapted to close the switch as a function of the magnitude of an induced voltage in the trigger coil. A peak and hold circuit may include a power storage device coupled to the charge coil to receive a portion of a voltage induced in the charge coil, and the peak detection circuit may include a shorting switch coupled to the power storage device. When a sufficient power level is provided from the power storage device to the shorting switch, the shorting switch is closed and energy in the peak detection circuit is short-circuited to ground to prevent the peak detection circuit from causing the main ignition switch to close.

The system may also include at least one switch coupled to a power storage device of the analog circuit components and to ground, and the microprocessor may actuate the switch to short-circuit the power storage device when the microprocessor is operable to control ignition events. This may prevent the analog circuit components from causing an ignition event when the microprocessor is operable to control ignition events. In at least some implementations, the analog circuit components are arranged to provide an ignition signal at an engine speed below 200 rpm. In at least some implementations, a magneto system induces current in the trigger coil and the charge coil, and power to operate the microprocessor comes from the trigger coil or the charge coil. A main charge storage element is coupled to the charge coil and may be charged when positive current is induced in the charge coil, and negative current induced in the charge coil may be used to power the microprocessor.

In at least some implementations, an ignition system for an engine having a flywheel, a magnetic element carried by the flywheel, and a piston, the system includes:

a trigger coil and a charge coil arranged so that rotation of the flywheel passes the magnet near both the trigger coil and the charge coil to induce a current within the coils;

a main charge storage element coupled to the charge coil to store energy from the charge coil;

a main switch coupled to the charge storage element and to an ignition element to selectively couple the main charge storage element to the ignition element to provide power from the main charge storage element to the ignition element to cause an ignition event;

a peak detect charge storage element coupled to the trigger coil and to the main switch;

a peak detect switch coupled between the main switch and the peak detect charge storage element to selectively provide power from the peak detect charge storage element to the main switch to change the state of the main switch and permit power to flow from the main charge storage element to the ignition element to cause an ignition event; and a controller coupled to the main switch to selectively change the state of the main switch, wherein the controller is powered by energy induced in a coil and provided to the controller when the engine is at a speed at which the energy above a threshold is induced in the coil that provides power to the controller so that the controller controls the state of the main switch and the timing of ignition events when the controller is provided with power above said threshold.

The threshold need not be a set value and can be a power level at which the controller is sufficiently operational to be able to change the state of the switch. Different systems can generate different levels of power at engine cranking speeds so the speed at which the controller is operational to control ignition events may vary among systems. In at least some implementations, the coil that provides power to the controller is one of the trigger coil or the charge coil, or a secondary coil that is not the charge coil or the trigger coil. In at least some implementations, the trigger coil and the charge coil are wound on the same leg of a lamstack.

In at least some implementations, a shorting switch is coupled between ground and the peak detect power storage element to selectively short to ground the peak detect power storage element, and wherein the switch is also coupled to the controller so that the controller can change the state of the switch to short to ground the peak detect power storage element to prevent the energy in the peak detect power storage element from being delivered to the main switch. In at least some implementations, two current pulses are induced in the trigger coil and wherein the analog circuit components include a peak and hold charge storage device coupled to the shorting switch to actuate the shorting switch and short the peak detect power storage device to ground so that the energy from one of the two pulses induced in the trigger coil is shorted to ground. A first one of the two current pulses may occur before a current pulse is induced in the charge coil and the a second one of the two current pulses may occur after the current is induced in the charge coil, and the energy from the second one of the two current pulses is shorted to ground or otherwise dissipated.

BRIEF DESCRIPTION OF THE DRAWINGS

The following detailed description of certain embodiments and best mode will be set forth with reference to the accompanying drawings, in which.

DETAILED DESCRIPTION

Figure 1:
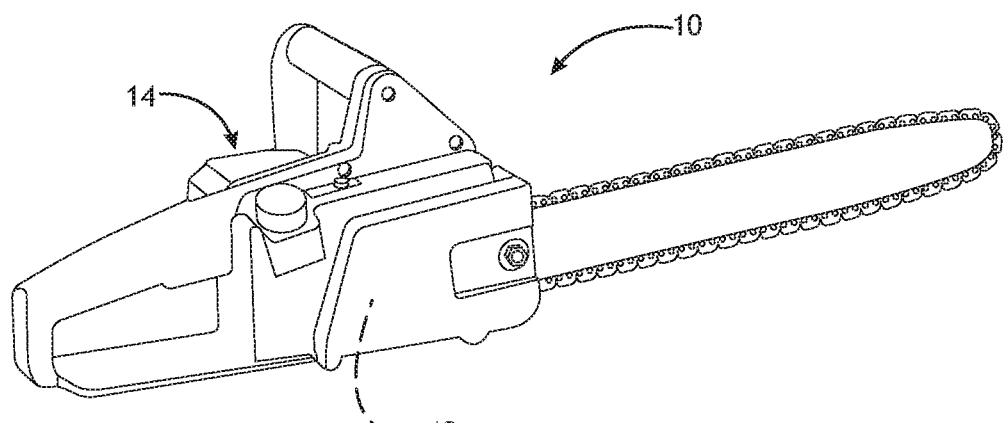
FIG. 1 is a perspective view of a tool including an internal combustion engine and an ignition system that is configured to control ignition events in the engine.

Referring in more detail to the drawings, FIG. 1 illustrates one example of a handheld power tool or product in the form of a chainsaw 10 powered by a small or light-duty internal combustion engine 12. Typically, the engine is a single cylinder two-stroke or four-stroke gasoline powered internal combustion engine, however engines having more than one cylinder may be used. Typically, this engine 12 has an ignition module 14 that supplies a high voltage ignition pulse to a spark plug for igniting an air and fuel mixture in the engine cylinder; e.g., this ignition module 14 may vary and control the ignition timing in response to changing engine operating conditions.

Typically, the engine 12 does not have any battery supplying an electric current to the spark plug or powering the ignition module 14. The engine 12 may be manually cranked for starting, such as with a recoil rope starter. The term "light-duty combustion engine" broadly includes all types of non-automotive combustion engines including two and four-stroke gasoline powered engines used in various products including portable electric generators, air compressors, water pumps, power washers, snow blowers, personal watercraft, boats, snowmobiles, motorcycles, all-terrain vehicles, lawn and garden equipment such as garden tractors, tillers, chainsaws, landscape edgers, grass and weed trimmers, air blowers, leaf blowers, etc.

Figure 2:
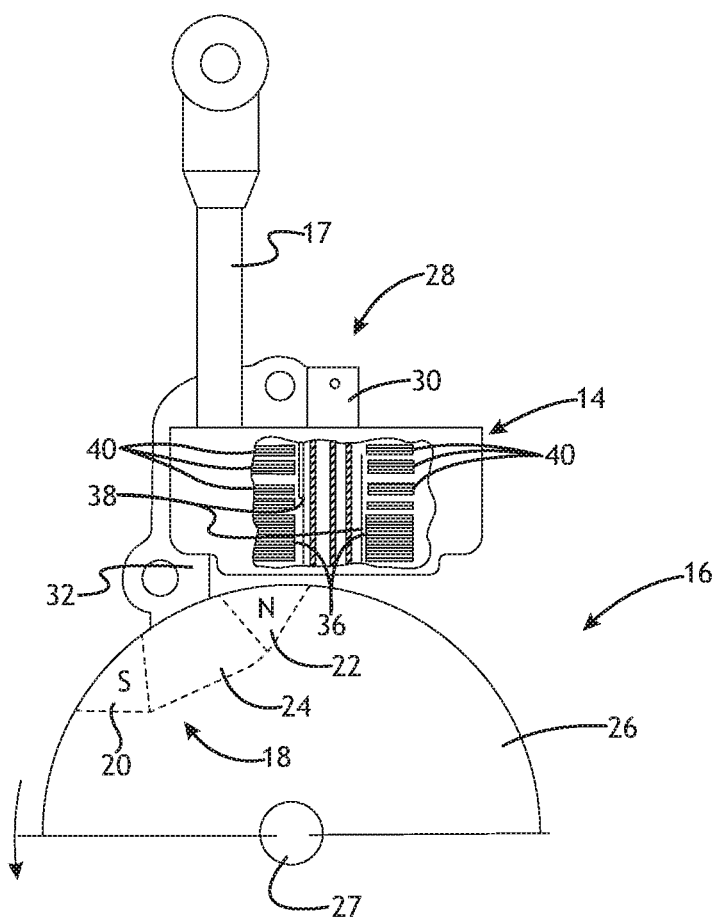
FIG. 2 is a diagrammatic view of a flywheel and an ignition system that may be used control ignition events in an engine.

FIG. 2 schematically illustrates the ignition module 14 coupled to a magneto system 16 used to provide electric current via a wire 17 to fire the spark plug, as well as to supply power for other devices (e.g. a microprocessor or other controller, a solenoid valve, etc). This magneto system includes a magnet element 18 with pole shoes 20, 22 and a permanent magnet 24 mounted on a flywheel 26 that is coupled to a crank shaft 27 such that when rotating the flywheel induces a magnetic flux in a nearby stator assembly of the module 14 as the magnet element 18 passes thereby.

The stator assembly may include a lamstack 28 having a first leg 30 and a second leg 32 (separated from the rotating flywheel 27 by a relatively small and measured air gap which may be about 0.3 mm), a first coil or winding, sometimes called a charge coil 36, an ignition primary coil winding 38 and a secondary or trigger coil winding 40 which may all be wrapped around a single leg of the lamstack. The lamstack 28 may be a generally U-shaped ferrous armature made from a stack of iron plates and may be in a module housing located on the engine. The ignition primary and secondary coil windings 38, 40 may provide a step-up transformer and as is well known by those skilled in the art, the primary winding 38 may have a comparatively few turns of a relatively heavy gauge wire, while the secondary ignition coil winding 40 may have many turns of a relatively fine wire. The ratio of turns between the primary and secondary ignition windings generates a high voltage potential in the secondary winding that is used to fire a spark plug of the engine to provide an electric arc or spark and consequently ignite an air-fuel mixture in the engine combustion chamber (not shown). Of course, the illustrated lamstack 28 is merely one implementation; e.g., in other embodiments, one or more of the illustrated coils could be arranged around the first leg 30 instead, and other legs and coils may be provided as desired.

Figure 3:
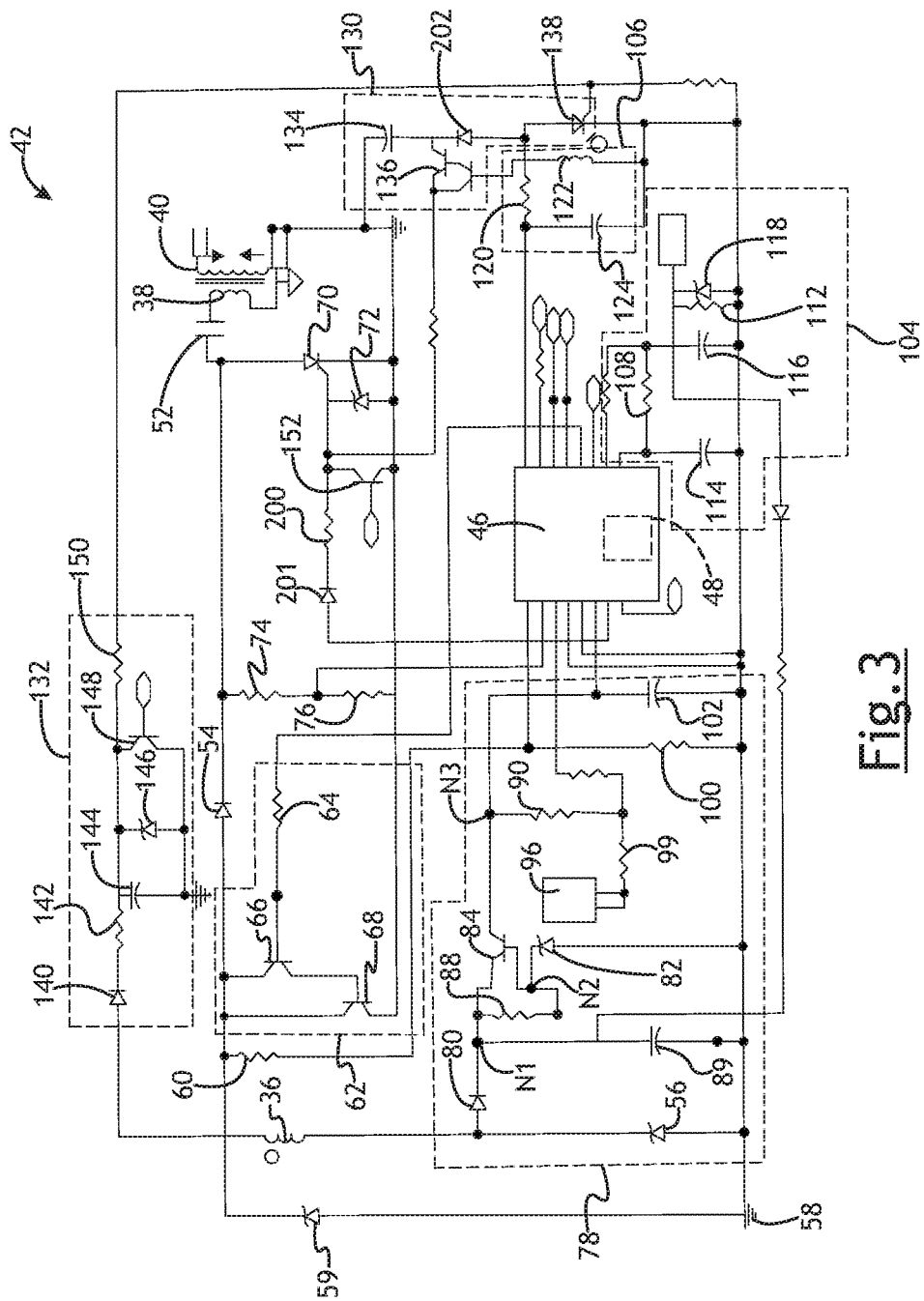
FIG. 3 is a schematic circuit diagram of an implementations of a circuit of the ignition system.

As shown in FIG. 3, the control and communication module 14 may include a capacitive discharge ignition (CDI) circuit 42 on a printed circuit board or circuit card. The circuit 42 may include a controller, e.g. a microcontroller or microprocessor 46, as set forth below.

The microprocessor 46 (also shown in FIG. 3) may be any suitable processing device capable of executing digitally-stored instructions stored on memory 48. Memory 48 should be construed broadly to include reprogrammable or flash EEPROM (electrically erasable, programmable read-only memory), RAM (random access memory), ROM (read-only memory), EPROM (erasable, programmable read-only memory), or any other suitable non-transitory computer readable medium. In FIG. 3, the memory is shown internal to the microprocessor 46; however, this is not required (e.g., memory may be internal to microprocessor 46, external to microprocessor 46, or both). Non-limiting examples of instructions stored in memory 48 may include: storing a look-up table, algorithm and/or code to determine and vary the engine ignition timing relative to top dead center of the piston in the cylinder for various engine operating speeds and conditions, an algorithm to vary and control the fuel-to-air ratio of the air-and-fuel mixture supplied to the cylinder of the operating engine in response to various engine operating speeds and conditions, etc. Examples of how microcontrollers can implement ignition timing systems can be found in U.S. Pat. Nos. 7,546,846 and 7,448,358, the disclosures of which are incorporated herein by reference. As used herein, the term instructions should be construed broadly to include software, firmware, or any other suitable code or like set of computer-readable commands or directions.

As described more below, circuit 42 is coupled to and controlled by microprocessor 46. As used herein, the term "coupled" broadly encompasses all ways in which two or more electrical components, devices, circuits, etc. can be in electrical communication with one another; this includes, but is not limited to, a direct electrical connection and a connection via an intermediate component, device, circuit, etc. The circuit diagram shown in FIG. 3 is merely one example; other implementations having the same or similar functions also may be used.

According to one aspect of the ignition circuit 42, the microcontroller 46 uses induced magneto system current to operate the circuit 42 (e.g., and thereby a fire spark plug). For example, when the magneto system 16 induces a positive current in the power charge coil 36, an ignition capacitor 52 that is coupled to a first end of the coil 36 via diode 54 is charged. The other end of the power charge coil 36 may be connected to circuit ground 58 via a zener diode 56. Circuit 42 also may have one or more overvoltage protection components associated with coil 36; these include a transient-voltage-suppression or TVS diode 59 coupled between the first end of coil 36 and ground 58, and also resistor 60. Thus, a majority of the energy induced in the power charge winding 36 may be supplied to the capacitor 52 which stores this energy until the microcontroller 46 (via pin 12 in the example shown) changes a switch 62 to a conductive state to discharge the capacitor 52 through the primary coil 38 of the transformer which induces in the secondary coil 40 a high voltage potential which is applied to the spark plug to provide a combustion initiating arc or spark.

For example, switch 62 may include a resistor 64 and two NPN transistors 66, 68 arranged in a so-called Darlington common collector arrangement or pattern. The resistor 64 may be coupled between a base of transistor 66 and pin 12 of the microprocessor 46. Each of the collectors of transistors 66, 68 may be coupled to the first end of charge coil 36, and an emitter of transistor 66 can be coupled to a base of transistor 68. The emitter of transistor 68 may be coupled to circuit ground 58 and a number of other components which enable the capacitor 52 to drain quickly—e.g., as discussed below, these components may include a thyristor 70 such as a silicon controlled rectifier (SCR), a zener diode 72, and resistors 74, 76. Thus, an enable signal sent from the microprocessor 46 via pin 12 may actuate transistor 66 thereby placing the switch 62 in the conductive state.

One end of the thyristor 70 is shown coupled to the capacitor 52, while the other end is coupled to circuit ground 58. Each of diode 201, resistor 200, and zener diode 72 are coupled to a gate of the thyristor 70 such that when current flows through the gate of thyristor 70, the gate voltage is sufficient to actuate the thyristor 70 thereby creating a short or discharge path through the thyristor 70 from the ignition capacitor 52 to circuit ground 58. A rapid discharge of the ignition capacitor 52 causes a surge in current through the primary ignition coil 38, which in turn, creates a fast-rising electromagnetic field in the primary ignition coil. The fast-rising electromagnetic field induces a high voltage ignition pulse in the secondary ignition coil 40. The high voltage ignition pulse travels to spark plug 30 which, assuming it has the requisite voltage, provides a combustion-initiating arc or spark. Other sparking techniques, including flyback techniques, may be used.

As also discussed briefly above, the magneto system 16 may supply electric power to operate the microprocessor 46, this power may be managed and/or controlled by a power circuit 78. More specifically, electrical power can be provided to the microprocessor 46 during a negative phase of the magneto system 16; e.g., when the system 16 induces negative current in the power charge coil 36, power is provided to pin 6 using power circuit 78. Circuit 78 may include, among other things, diode 80, a zener diode 82, an NPN transistor 84 (which could be packaged with the diode 82), and a kill switch circuit 86. In the illustrated arrangement, diode 80 is coupled between the second end of charge coil winding 36 and a node N1 (or a collector of transistor 84). Node N1 is also coupled to node N2 (a base of transistor 84) via resistor 88, and node N1 further is coupled to circuit ground 58 via capacitor 89. Zener diode 82 is coupled between node N2 and circuit ground 58, and node N3 further is coupled to pin 6 (input voltage pins of microprocessor 46) thereby powering the processor 46 using the negative portion of the AC signal generated by coil 36. In the illustrated circuit, pin 6 is coupled to ground 58 via capacitor 102.

In at least some implementations, the ignition circuit 42 also could include a programming or data circuit 104 and a speed measuring circuit 106. The programming circuit 104 may enable configuration changes to microprocessor instructions or algorithms, and the circuit 104 may include resistors 108-112, capacitors 114, 116, and a zener diode 118. Speed and position measuring circuit 106 may provide an analog trigger signal for providing the microprocessor 46 with a revolution speed and position (e.g., associated with the magneto system 16). For example, the analog trigger signal may be used to calculate engine timing calculations. For example, pin 16 may be coupled to an RLC circuit (having within one current loop a resistor 120, a coil 122, and a capacitor 124)—e.g., coil 122 may be located on lamstack 28 (which is shown in FIG. 2). It should be appreciated that circuit 104 is optional.

As noted above, the charge coil 36 and trigger coil 122 may both be wound upon the same lamstack leg and provide signals upon passing of the magnet element 18 thereby as the flywheel 27 rotates. The signals are generally the induced current in the coils and occur in the form of rising (as the magnet approaches or gets nearer to the coil) and falling (as the magnet passes and gets farther from the coil) pulses which may be detected and monitored. Having the charge coil and trigger coil on the same lamstack leg may permit the overall size of the ignition module 14 to be reduced while still providing the power and signals needed for control of the ignition function, as set forth below.

As the flywheel rotates 27 and the magnet element 18 passes the coils, 36, 38, 40 and 122 for each revolution of the flywheel, a first pulse and a third pulse are induced in the trigger coil 122 and a pulse is induced in the charge coil 36 which is called herein a second pulse as it occurs time-wise between the two pulses induced in the trigger coil. The first and third pulses may be used for timing, engine speed detection and/or other purposes (e.g. a power supply for other things in the circuit). The second pulse is primarily used to charge the ignition capacitor 52 during a positive portion of the pulse and to provide power to the microprocessor 46 during the negative portion of the pulse, as set forth above.

The circuit 42 is configured so that an ignition event can be initiated and controlled at very low engine speeds to facilitate starting and initial operation after starting the engine. In the example shown, the low speed control of the ignition event is accomplished with analog components and primarily without the microprocessor 46. When the microprocessor 46 is sufficiently powered up and able to control the timing, the ignition events are then controlled by the microprocessor which manages a handoff or transition from the low speed, analog control to the higher speed digital control of the ignition events.

The low speed ignition control may be managed, at least in part, by a peak detect feature (e.g. a circuit or subcircuit 130) and a peak and hold feature (e.g. a circuit or subcircuit 132). The peak detect circuit 130 is used to cause an ignition event near, at or after the peak of a first pulse in the trigger coil 40. In at least some implementations, the ignition event is attempted only if the charge stored on the ignition capacitor 52 is above a threshold magnitude, which threshold may be set in advance as a function of the engine and ignition system being used and at or above a threshold at which a sufficient spark is generated for an ignition event in the engine. Hence, the peak detect circuit 130 enables early firing of a spark plug at relatively low speed engine operation. The peak and hold circuit 132 may be used to prevent undesired ignition events which might otherwise occur via the peak detect circuit 130, for example, upon occurrence of the peak of the third pulse in the trigger coil and in similar fashion to that described with reference to the first pulse. The first pulse occurs before the second pulse, and hence, before charging of the ignition capacitor 52. The third pulse, on the other hand, occurs after the second pulse and hence, after charging of the charge capacitor 52. To prevent an attempted ignition event due to the third pulse, the peak and hold circuit 132 may short out or otherwise dissipate energy in the peak detect circuit 130. In at least some examples, energy in the peak and hold circuit 132 comes from the second pulse and may be used to activate a switch that shorts out the peak detect circuit, as will be set forth in more detail below.

The peak detect circuit 130 may include a capacitor 134 or other energy storage device, and a switch 136. The peak detect capacitor 134 is coupled to both the trigger coil 122 to receive energy from the trigger coil, and to the switch 136 which is shown as a Darlington PNP transistor in the illustrated embodiment. In the illustrated embodiment, the positive terminal of the peak detect capacitor 134 is coupled to the emitter of the transistor and the negative terminal of the capacitor 134 is coupled to ground 58. The peak detect transistor 136 is coupled at its base to the trigger coil 122, at its collector to the main trigger switch 70, and at its emitter also to SCR 138 through diode 202. The SCR 138 has its anode coupled to the trigger coil 122, cathode coupled to ground, capacitor 124 and coil 122, and its gate is communicated with the peak and hold circuit 132. So arranged, the emitter and base of the peak detect transistor 136 are at the same potential as the amplitude of the first pulse increases in the trigger coil 40 and no current flows through the transistor 136. However, when the amplitude of the first pulse decreases, the emitter is at a higher potential because of the peak detect capacitor 134 and diode 202 and current then flows through the transistor 136 to the gate of the main trigger switch 70. Current from the charge capacitor 52 then flows through the main trigger switch 70 to create a spark and ignition event. Accordingly, the spark and ignition event is generated at or after the peak amplitude of the first pulse in the trigger coil 40.

Phasing of the first pulse is a function of the location of the magnets 18 on the flywheel 27 which may be positioned as desired for a desired ignition timing in this situation. For example, the magnet may be positioned relative to an engine piston position (e.g. top dead center (TDC)) so that ignition occurs when the engine piston is in a desired position for low speed starting and initial engine operation. In at least some implementations, initial starting of the engine occurs at, near or just after TDC where just after TDC may be preferred in at least some implementations to reduce kickback and enable smoother starting and warming up of the engine. The engine timing may be changed from the timing used during starting and as desired during engine operation.

As noted above, to prevent an attempted ignition event due to the third pulse, the peak and hold circuit 132 may short out or otherwise dissipate energy in the peak detect circuit 130. The peak and hold circuit 132 may include a diode 140 and a resistor 142 coupled between the charge coil 36 and a peak and hold capacitor 144 so that part of the positive portion of the second pulse is communicated with the peak and hold capacitor. The capacitor 144 and a rectifier (shown as a zener diode 146) may be coupled in parallel to a transistor 148, with the base of the transistor coupled to the microprocessor at pin 11 (in the illustrated example). Charge on the peak and hold capacitor 144 is communicated with SCR 138 to turn on the SCR and thereby short-circuit to ground the trigger coil 122 so that the subsequent third pulse is not communicated with the main trigger switch 70 and no ignition event occurs as a result of the third pulse. A resistor 150 between the peak and hold capacitor 144 and SCR 138 may provide a decay rate for the charge on the capacitor sufficient to trigger the SCR 138 on during the third pulse to ensure that the charge coil is short-circuited during the third pulse. With the peak and hold capacitor 144 drained (at least sufficiently) to short-circuit the third pulse as noted, the subsequent first pulse may occur without the SCR 138 being short-circuited (i.e. the SCR 138 is released when the peak and hold capacitor 144 drains sufficiently). Thus, the subsequent first pulse may be used to initiate an ignition event. Following, the subsequent second pulse may be used to short out the trigger coil (via the peak and hold capacitor 144 and SCR 138) so that the subsequent third pulse does not initiate an ignition event.

This analog control of the ignition events may be used for a certain time period upon starting, or only until such time as the microprocessor 46 is sufficiently powered to control ignition, such as is set forth below. At least some analog ignition circuits are limited as to the extent of ignition timing change that may be implemented during engine operation, for example the extent to which the ignition timing may be advanced relative to TDC such as may be desired during acceleration, and/or the extent of ignition timing may be retarded such as may be desired during comedown, etc, as the timing is relatively fixed and the components needed to implement such changes become costly and space consuming.

Accordingly, primary engine ignition timing may be controlled by the microprocessor 46 when it is sufficiently powered up. When the microprocessor 46 is powered up, which may be a momentary supply of power and a less than full supply of power (where full may mean the nominal voltage supplied to the microprocessor), the microprocessor may short circuit the peak and hold transistor 148 (e.g. via a signal from pin 11) so that charge on the peak and hold capacitor 144 is sent to ground. Further, the microprocessor 46 may keep the peak detect circuit from firing via transistor 152, coupled to pin 8 of the microprocessor, so that the third pulse does not turn on the SCR 70 and no ignition event is initiated due to the third pulse. In this way, the microprocessor 46 may override the analog components that were handling initial ignition events in the engine as the engine was started and during initial engine operation, so that the microprocessor can control the ignition timing as soon as possible. Control of the ignition timing via the microprocessor 46 occurs, at least in the example shown, via pin 7 which is communicated with or coupled to the main trigger 70. Further, when the microprocessor 46 is in control of the ignition events, a signal to transistor 152 via pin 8 of the microprocessor may be used to short-circuit the peak detection capacitor 134 so analog ignition attempts do not occur. Among other things, as noted above, microprocessor control of the ignition events permits improved control of the ignition timing, the ability to readily and easily vary the ignition timing, and the ability to accurately time ignition events at higher engine speeds.

In at least some implementations, the initial analog control of the ignition events via the peak detect circuit 130 and peak and hold circuit 132 may permit ignition events to occur at very low engine speeds, such as below 100 rpm, for example, between 60 and 80 rpm. Also in at least some implementations, the microprocessor 46 may be powered sufficiently to begin to control engine ignition timing at an engine speed of around 200 rpm, in some implementations between 150 and 300 rpm. Existing digital ignition systems have problems providing a reliable ignition timing at engine speeds below 250 or 300 rpm. Accordingly, the ignition system set forth herein provides a significant improvement in low speed engine starting and operation while also enabling digital ignition control at higher engine speeds.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. An ignition system for a combustion engine, comprising:
   analog circuit components arranged to control ignition events at an engine speed below a first threshold of engine speed and a microprocessor to control ignition events at engine speeds higher than the first threshold, wherein the analog circuit components control ignition events before the microprocessor has sufficient power for the microprocessor to control ignition events.

2. The system of claim 1 wherein the analog circuit components include a charge coil, a trigger coil, a main ignition switch, a peak detection circuit coupled to the main ignition switch and adapted to close the switch as a function of the magnitude of an induced voltage in the trigger coil.

3. The system of claim 2 wherein the analog circuit includes a peak and hold circuit that includes a power storage device that is separate from an ignition capacitor that is discharged when the main ignition switch is closed to cause an ignition event, and the power storage device is coupled to the charge coil to receive a portion of a voltage induced in the charge coil, and wherein the peak detection circuit includes a shorting switch coupled to the power storage device so that when a sufficient power level is provided from the power storage device to the shorting switch, the shorting switch is closed and energy in the peak detection circuit is short-circuited to ground to prevent the peak detection circuit from causing the main ignition switch to close.

4. The system of claim 1 which also includes at least one switch coupled to a power storage device of the analog circuit components and to ground, and wherein the microprocessor actuates the switch to short-circuit the power storage device when the microprocessor is operable to control ignition events.

5. The system of claim 1 wherein the analog circuit components are arranged to provide an ignition signal at an engine speed below 200 rpm.

6. The system of claim 1 which includes a magneto system which induces current in the trigger coil and the charge coil, and wherein power to operate the microprocessor comes from the trigger coil or the charge coil.

7. The system of claim 6 which includes a main charge storage element coupled to the charge coil, wherein the main charge storage element is charged when positive current is induced in the charge coil, and negative current induced in the charge coil is used to power the microprocessor.

8. The system of claim 1 wherein the charge coil is on a leg of a lamstack having at least two legs, and the trigger coil is on the same leg of the lamstack as the charge coil.

9. The system of claim 1 wherein the microprocessor is not powered by a battery or other DC power source.

10. The system of claim 1 wherein, when the microprocessor has power sufficient to operate, the microprocessor prevents the analog components from initiating an ignition event.

11. The system of claim 10 which also includes at least one switch coupled to ground and to a power storage device, wherein the power storage device is separate from an ignition capacitor that is discharged when the main ignition switch is closed to cause an ignition event, and wherein, to prevent the analog components from initiating an ignition event, the microprocessor actuates the switch to short-circuit the power storage device when the microprocessor is operable to control ignition events.

12. An ignition system for an engine having a flywheel, a magnetic element carried by the flywheel, and a piston, the system comprising:
   a trigger coil and a charge coil arranged so that rotation of the flywheel passes the magnet near both the trigger coil and the charge coil to induce a current within the coils;
   a main charge storage element coupled to the charge coil to store energy from the charge coil;
   a main switch coupled to the charge storage element and to an ignition element to selectively couple the main charge storage element to the ignition element to provide power from the main charge storage element to the ignition element to cause an ignition event;
   a peak detect charge storage element coupled to the trigger coil and to the main switch;
   a peak detect switch coupled between the main switch and the peak detect charge storage element to selectively provide power from the peak detect charge storage element to the main switch to change the state of the main switch and permit power to flow from the main charge storage element to the ignition element to cause an ignition event; and
   a controller coupled to the main switch to selectively change the state of the main switch, wherein the controller is powered by energy induced in a coil and provided to the controller when the engine is at a speed at which the energy above a threshold is induced in the coil that provides power to the controller so that the controller controls the state of the main switch and the timing of ignition events when the controller is provided with power above said threshold.

13. The system of claim 12 wherein the threshold is not a set value and is a power level at which the controller is sufficiently operational to be able to change the state of the switch.

14. The system of claim 12 wherein the coil that provides power to the controller is one of the trigger coil or the charge coil.

15. The system of claim 12 wherein the coil that provides power to the controller is a secondary coil that is not the charge coil or the trigger coil.

16. The system of claim 12 which also includes a lamstack having one or more legs, and wherein the trigger coil and the charge coil are wound on the same leg of the lamstack.

17. The system of claim 12 which also includes a shorting switch coupled between ground and the peak detect power storage element to selectively short to ground the peak detect power storage element, and wherein the switch is also coupled to the controller so that the controller can change the state of the switch to short to ground the peak detect power storage element to prevent the energy in the peak detect power storage element from being delivered to the main switch.

18. The system of claim 17 wherein two current pulses are induced in the trigger coil and wherein the analog circuit components include a peak and hold charge storage device coupled to the shorting switch to actuate the shorting switch and short the peak detect power storage device to ground so that the energy from one of the two pulses induced in the trigger coil is shorted to ground.

19. The system of claim 18 wherein a first one of the two current pulses occurs before a current pulse is induced in the charge coil and the a second one of the two current pulses occurs after the current is induced in the charge coil, and wherein the energy from the second one of the two current pulses is shorted to ground or otherwise dissipated.

* * * * *